(12) United States Patent
Mack

(10) Patent No.: US 11,566,868 B2
(45) Date of Patent: Jan. 31, 2023

(54) FIREARM STORAGE DEVICE

(71) Applicant: HORNADY MANUFACTURING COMPANY, Grand Island, NE (US)

(72) Inventor: Matthew Mack, Grand Island, NE (US)

(73) Assignee: HORNADY MANUFACTURING COMPANY, Grand Island, NE (US)

( * ) Notice: Subject to any disclaimer, the term of this patent is extended or adjusted under 35 U.S.C. 154(b) by 198 days.

(21) Appl. No.: 16/953,983

(22) Filed: Nov. 20, 2020

(65) Prior Publication Data

US 2021/0156644 A1 May 27, 2021

Related U.S. Application Data

(60) Provisional application No. 62/938,431, filed on Nov. 21, 2019.

(51) Int. Cl.
| | |
|---|---|
| *F41C 33/06* | (2006.01) |
| *F16B 1/00* | (2006.01) |
| *A47B 81/00* | (2006.01) |

(52) U.S. Cl.
CPC ............ *F41C 33/06* (2013.01); *A47B 81/005* (2013.01); *F16B 1/00* (2013.01); *F16B 2001/0035* (2013.01)

(58) Field of Classification Search
CPC .... F41C 33/06; F16B 1/00; F16B 2001/0035; A47B 81/005; A47B 96/061; A47B 57/16; F41A 23/18; B60R 7/14
USPC .......... 312/351; 211/60.1, 62–64, 35, 87.01, 211/113, 119, 13.1; 206/315.1, 315.11, 206/317; 248/206.5, 309.4, 467, 537, 248/683; 89/37.04; D6/552, 553, 567; D22/109

See application file for complete search history.

(56) References Cited

U.S. PATENT DOCUMENTS

| | | | |
|---|---|---|---|
| 1,240,981 A | 9/1917 | Kohl | |
| 2,727,800 A | 12/1955 | Snider | |
| 2,837,393 A | 6/1958 | Sitler | |
| 3,095,724 A | 7/1963 | Truhon | |
| D225,706 S * | 1/1973 | McCollum | ..................... D6/552 |
| 3,865,166 A | 2/1975 | Pedro | |

(Continued)

FOREIGN PATENT DOCUMENTS

| | | | |
|---|---|---|---|
| DE | 19700330 | * | 7/1997 |
| EP | 1092615 | | 4/2001 |

OTHER PUBLICATIONS

English translation for DE19700330 (Year: 1997).*

(Continued)

*Primary Examiner* — Janet M Wilkens
(74) *Attorney, Agent, or Firm* — McHale & Slavin, P.A.

(57) ABSTRACT

A firearm storage system is provided. It can include an enclosure device adapted for having a firearm mounting device mounted to a support member, such as a generally vertically disposed panel or wall. The mounting device includes a notch forming member forming a series of notches and loops in an alternating pattern, such that a long firearm can be stored next to a short firearm, utilizing space between adjacent long firearms for the storage of the short firearm. The barrels of the firearms are generally vertically disposed during storage and can be angled to apply a force on the firearms, and, in particular, on the long firearm to help retain the firearms in their respective portions of the mounting device.

18 Claims, 8 Drawing Sheets

(56) References Cited

U.S. PATENT DOCUMENTS

| | | | |
|---|---|---|---|
| 3,913,745 A * | 10/1975 | Weiss | A47F 7/08 211/119 |
| 3,953,061 A | 4/1976 | Hansen et al. | |
| D242,097 S * | 11/1976 | O'Neal | D6/552 |
| 4,155,608 A | 5/1979 | Orlewicz | |
| 4,342,207 A | 8/1982 | Holmes et al. | |
| 4,447,099 A | 5/1984 | French et al. | |
| 4,470,277 A | 9/1984 | Uyeda | |
| 4,489,833 A | 12/1984 | Bauer | |
| 4,579,400 A | 4/1986 | French | |
| 4,616,889 A | 10/1986 | Peterman | |
| 4,862,324 A | 8/1989 | Kalvaitis et al. | |
| 4,890,466 A | 1/1990 | Cislo | |
| 4,917,022 A | 4/1990 | Ogasawara et al. | |
| 4,964,286 A | 10/1990 | Poyer | |
| 5,010,751 A | 4/1991 | Schwartz et al. | |
| 5,056,342 A | 10/1991 | Prinz | |
| 5,060,583 A | 10/1991 | Stinson | |
| 5,078,437 A | 1/1992 | Borgmeyer et al. | |
| 5,111,199 A | 5/1992 | Tomoda et al. | |
| 5,170,919 A | 12/1992 | DeSantis et al. | |
| 5,203,462 A * | 4/1993 | Brooks | A47F 5/08 D6/552 |
| 5,236,086 A | 8/1993 | McTaggart | |
| 5,280,755 A | 1/1994 | Batur | |
| 5,294,031 A | 3/1994 | Volpei et al. | |
| 5,374,919 A | 12/1994 | Zelka et al. | |
| 5,495,967 A | 3/1996 | Parton | |
| 5,495,969 A * | 3/1996 | Cardenas | B60R 7/14 211/195 |
| 5,531,082 A | 7/1996 | Wolk et al. | |
| 5,579,909 A | 12/1996 | Deal | |
| 5,584,424 A | 12/1996 | Stava | |
| 5,632,166 A | 5/1997 | Wiersma | |
| 5,662,219 A | 9/1997 | Tschudy et al. | |
| 5,671,830 A | 9/1997 | Wood | |
| 5,687,896 A | 11/1997 | Clift | |
| 5,768,920 A | 6/1998 | DeBevoise | |
| 5,881,584 A | 3/1999 | Brunowksi et al. | |
| 5,924,565 A | 7/1999 | Colee | |
| 5,943,888 A | 8/1999 | Lawson | |
| 5,967,393 A | 10/1999 | Clarke, III | |
| 6,192,719 B1 | 2/2001 | Stukas et al. | |
| 6,209,250 B1 | 4/2001 | Mills | |
| 6,237,271 B1 | 5/2001 | Kaminski | |
| 6,260,300 B1 | 7/2001 | Klebes et al. | |
| 6,267,462 B1 * | 7/2001 | Krause | A47B 87/007 312/111 |
| 6,279,359 B1 | 8/2001 | Boisvert | |
| 6,293,207 B1 | 9/2001 | Do | |
| 6,318,134 B1 | 11/2001 | Mossberg et al. | |
| 6,351,906 B1 | 3/2002 | Honig, Jr. et al. | |
| 6,405,861 B1 | 6/2002 | Siler et al. | |
| 6,478,391 B1 | 11/2002 | Stoever | |
| 6,561,601 B1 | 5/2003 | Maffeo | |
| 6,570,501 B2 | 5/2003 | Bushnell et al. | |
| 6,606,492 B1 | 8/2003 | Losey | |
| D487,192 S | 3/2004 | Famham et al. | |
| 6,843,081 B1 | 1/2005 | Painter | |
| 6,876,756 B1 | 4/2005 | Vieweg | |
| 7,143,913 B2 | 12/2006 | Lindsey et al. | |
| 7,296,448 B1 | 11/2007 | Shaw | |
| 7,434,427 B1 | 10/2008 | Miresmaili | |
| 7,469,564 B1 | 12/2008 | Shaw | |
| 7,478,892 B2 * | 1/2009 | Punzel | A47B 81/005 312/351 |
| 7,510,078 B2 | 3/2009 | Schmidt et al. | |
| 7,537,117 B2 | 5/2009 | Roesler | |
| 7,628,113 B2 | 12/2009 | Pallo et al. | |
| D617,525 S | 6/2010 | Taylor | |
| 7,845,202 B2 | 12/2010 | Padilla et al. | |
| 7,903,846 B2 | 3/2011 | Fisher | |
| D643,500 S * | 8/2011 | Sanders | D22/199 |
| 7,997,630 B2 | 8/2011 | Lemley et al. | |
| 8,042,890 B2 | 10/2011 | Collins et al. | |
| 8,074,477 B1 | 12/2011 | Weiche | |
| 8,104,313 B2 | 1/2012 | Wolfe | |
| 8,201,426 B2 | 6/2012 | Heim et al. | |
| 8,207,816 B2 | 6/2012 | Crigger et al. | |
| 8,342,324 B2 | 1/2013 | Debias | |
| 8,393,111 B1 * | 3/2013 | Johnson | A01K 97/10 43/21.2 |
| 8,485,613 B1 | 7/2013 | Steffen et al. | |
| 8,826,704 B1 | 9/2014 | Marshall | |
| 9,007,170 B2 | 4/2015 | Wall et al. | |
| 9,301,603 B1 | 4/2016 | Koehn et al. | |
| 9,303,950 B2 | 4/2016 | Fuller | |
| 9,328,536 B2 | 5/2016 | Shute et al. | |
| 9,428,114 B2 | 8/2016 | Mothersele | |
| 9,530,266 B2 | 12/2016 | Delattre et al. | |
| 9,534,867 B2 | 1/2017 | Dunn et al. | |
| 9,535,867 B2 | 1/2017 | Dunn et al. | |
| 9,717,286 B1 | 8/2017 | Wall et al. | |
| 9,719,286 B2 | 8/2017 | Wall et al. | |
| 9,740,920 B1 | 8/2017 | Chang et al. | |
| 10,233,687 B2 | 3/2019 | Delattre et al. | |
| 10,253,529 B1 | 4/2019 | McGinn | |
| 10,810,846 B1 * | 10/2020 | Gonzalez | G08B 13/149 |
| D922,791 S * | 6/2021 | Yang | D6/552 |
| D953,774 S * | 6/2022 | Serhii | D6/552 |
| 2001/0010491 A1 | 8/2001 | Mameweck et al. | |
| 2003/0001724 A1 | 1/2003 | Willats et al. | |
| 2003/0167693 A1 | 9/2003 | Mainini | |
| 2003/0217574 A1 | 11/2003 | Meis | |
| 2004/0045329 A1 | 3/2004 | Famham et al. | |
| 2004/0237606 A1 | 12/2004 | Iwamoto | |
| 2005/0194872 A1 | 9/2005 | Cleveland et al. | |
| 2005/0235711 A1 | 10/2005 | Martin et al. | |
| 2006/0213239 A1 | 9/2006 | Roatis et al. | |
| 2006/0283219 A1 | 12/2006 | Bendz et al. | |
| 2007/0018787 A1 | 1/2007 | Martinez de Velasco Cortina et al. | |
| 2007/0257772 A1 | 11/2007 | Marcelle et al. | |
| 2008/0047860 A1 | 2/2008 | Shane | |
| 2008/0180211 A1 | 7/2008 | Lien | |
| 2008/0203860 A1 | 8/2008 | Myers | |
| 2008/0256998 A1 | 10/2008 | Mallian et al. | |
| 2008/0264309 A1 | 10/2008 | Villiger | |
| 2009/0184822 A1 | 7/2009 | Mahaffey et al. | |
| 2009/0308116 A1 | 12/2009 | Lambrou | |
| 2010/0025446 A1 | 2/2010 | Eberle | |
| 2010/0194527 A1 | 8/2010 | Loughlin et al. | |
| 2010/0236298 A1 | 9/2010 | James et al. | |
| 2010/0243492 A1 | 9/2010 | Bulthuis, Jr. et al. | |
| 2010/0270201 A1 | 10/2010 | Cauley et al. | |
| 2010/0300158 A1 | 12/2010 | Andres et al. | |
| 2010/0308702 A1 * | 12/2010 | Apgood, II | A47F 5/0846 29/525.01 |
| 2011/0162564 A1 | 7/2011 | Heim et al. | |
| 2011/0174200 A1 | 7/2011 | Bartel | |
| 2011/0226712 A1 * | 9/2011 | Morton | F41A 23/18 211/119.004 |
| 2011/0247950 A1 | 10/2011 | McGee | |
| 2011/0290837 A1 | 12/2011 | Smith | |
| 2012/0152776 A1 | 6/2012 | Camp | |
| 2012/0291327 A1 | 11/2012 | Boutot, Jr. | |
| 2012/0324968 A1 | 12/2012 | Goren et al. | |
| 2013/0002116 A1 * | 1/2013 | Lodge | A47B 81/00 312/351.1 |
| 2013/0025511 A1 | 1/2013 | Maxwell | |
| 2013/0055933 A1 | 3/2013 | Markham et al. | |
| 2013/0133558 A1 | 5/2013 | Andrews | |
| 2013/0134193 A1 | 5/2013 | Mothersele | |
| 2013/0298616 A1 | 11/2013 | Ullrich et al. | |
| 2014/0083338 A1 | 3/2014 | McAlexander | |
| 2014/0116303 A1 | 5/2014 | Mothersele | |
| 2014/0145819 A1 | 5/2014 | Wall et al. | |
| 2014/0182489 A1 | 7/2014 | Suggs et al. | |
| 2015/0096910 A1 | 4/2015 | Carson et al. | |
| 2015/0168100 A1 | 6/2015 | Hyde et al. | |
| 2015/0337588 A1 | 11/2015 | Kanhai | |
| 2016/0053526 A1 | 2/2016 | Dittrich | |
| 2017/0000965 A1 | 1/2017 | Cortez, Jr. et al. | |

(56) References Cited

U.S. PATENT DOCUMENTS

| | | |
|---|---|---|
| 2017/0046899 A1 | 2/2017 | Delattre et al. |
| 2017/0138112 A1 | 5/2017 | Makke et al. |
| 2017/0267188 A1 | 9/2017 | Wilkinson |
| 2018/0110331 A1 | 4/2018 | Mack |
| 2018/0335275 A1 | 11/2018 | Mack et al. |
| 2018/0372446 A1 | 12/2018 | Mack et al. |
| 2018/0372447 A1 | 12/2018 | Hyde |
| 2019/0170477 A1 | 6/2019 | Mack |
| 2019/0211607 A1 | 7/2019 | Delattre et al. |
| 2020/0096290 A1 | 3/2020 | Hui |
| 2020/0191522 A1 | 6/2020 | Searle et al. |
| 2020/0378721 A1 | 12/2020 | Mack et al. |

OTHER PUBLICATIONS

Anonymous, "The Gunbox 2.0", Safetech Products, LLC, Internet article retrieved Feb. 8, 2021, http://www.thegunbox.com/gbplus, (includes manuals for basic and wifi versions), (2020).

Anonymous, "SV500 SpeedVault Handgun Safe", GunVault, Internet article retrieved Feb. 8, 2021, http://www.gunvault.com/product/speedvault, (includes manual), (2021).

\* cited by examiner

FIREARM STORAGE DEVICE

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 62/938,431, entitled "FIREARM STORAGE DEVICE", filed Nov. 21, 2019. The contents of the above referenced application is incorporated herein by reference in its entirety.

FIELD OF THE INVENTION

The present invention relates to a storage system adapted for storing long arms and short arms in side by side relation to better utilize storage space in a firearm storage area in an enclosure such as a safe, or room such as a closet.

BACKGROUND OF THE INVENTION

The storage of firearms (guns) has long presented issues. They have been stored on the floor under beds, in closets behind clothes, in gun cabinets, in gun safes and on wall racks, amongst other ways. All forms of storage present unique issues. Under bed storage presents the issue of accumulation of dirt, reduced safety and security and, if multiple guns are stored, the removal or placement of one gun interfering with another gun. Similar issues present themselves with storage in a closet where the means of support is a wall. Resting against the wall allows freedom of movement of the guns laterally relative to each other, but they are free to fall over and possibly damage the firearm or cause a discharge of the firearm if loaded, marring the wall or causing damage to an adjacent firearm. The use of gun cases and gun safes provides separate retainers to help prevent movement of the firearm during storage. Typically, though, and particularly in gun safes, the firearms are placed close to one another to allow more firearms to be stored in a given space, which is typically small. While gun cases and safes are an improvement over loose storage under a bed or in a closet or the like, they too present storage issues and, in particular, effective space utilization.

While gun safes and gun cases are effective for space utilization for long firearms, such as rifles and shotguns, when short firearms such as pistols are stored in the same space, they are stored separately, typically taking up shelf space and, in some cases in safes, door space.

Numerous accessory items have been made available on the market to help improve space utilization in firearm storage areas. These accessories are typically directed to short firearms (like pistols), but can also be used to store other small items. One example is a coated wire rack specifically designed for the storage of short firearms on a shelf. Another accessory is a fabric panel with pockets that can be suspended from the safe door or a room door to free up shelf space for other items, such as collectibles, knives, wire racks for additional short firearms, and the like. While these accessories are effective, there is still unutilized space in the safe or gun case or storage room that can be utilized to combine the storage of long firearms with short firearms to effect freeing of storage space for other items.

DESCRIPTION OF THE PRIOR ART

Secure storage of long and short firearms is typically accomplished in locking gun cases, locking rooms, or safes forming an enclosure with walls and a door. Secure storage of firearms has even been mandated by statute in certain jurisdictions. However, and in particular with storage in a small room or safe, space is at a premium. The industry has developed devices to help better utilize storage space. Such devices include shelf racks particularly adapted for storage of short firearms such as pistols. These racks can better utilize space by having firearms stored next to one another while preventing contact therebetween. Such racks are typically made of formed wire that is coated with a polymer such as PVC. Polymer coating helps reduce the probability of marring of the finish on a stored firearm. Fabric panels with pockets have been devised for the storage of small items, including short firearms, and are adapted for hanging from a door, such as a safe door or a wall. Such panels use unused space adjacent a safe door when they are used inside a safe. Long firearms are typically stored in a generally vertical orientation with the barrels resting in a notch formed in a structural member. Such a structural member will have a series of spaced apart notches therein to allow the long firearms to be positioned adjacent one another in a row and resist lateral movement. A safe will typically have a series of these notched structural members arranged to help effectively utilize the space in a safe or the like. A gun case typically has one row of notches in each structural member.

There is a need for an improved firearm storage device that allows for better utilization of the space in a firearm storage area.

SUMMARY OF THE INVENTION

The present invention relates to a firearm storage device that is effective at better utilizing storage space.

Accordingly, it is a primary objective of the present invention to provide such a device that is effective at retaining firearms in preselected positions.

It is a further objective of the present invention to provide such a device that is adjustable in position for use to accommodate firearms of different sizes.

It is yet another objective of the present invention that utilizes currently unused space between adjacent long firearms for the storage of short firearms.

It is a still further objective of the present invention to provide a storage device that can be used in existing storage areas.

Other objects and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objectives and features thereof.

DETAILED DESCRIPTION OF THE INVENTION

Figure 1:
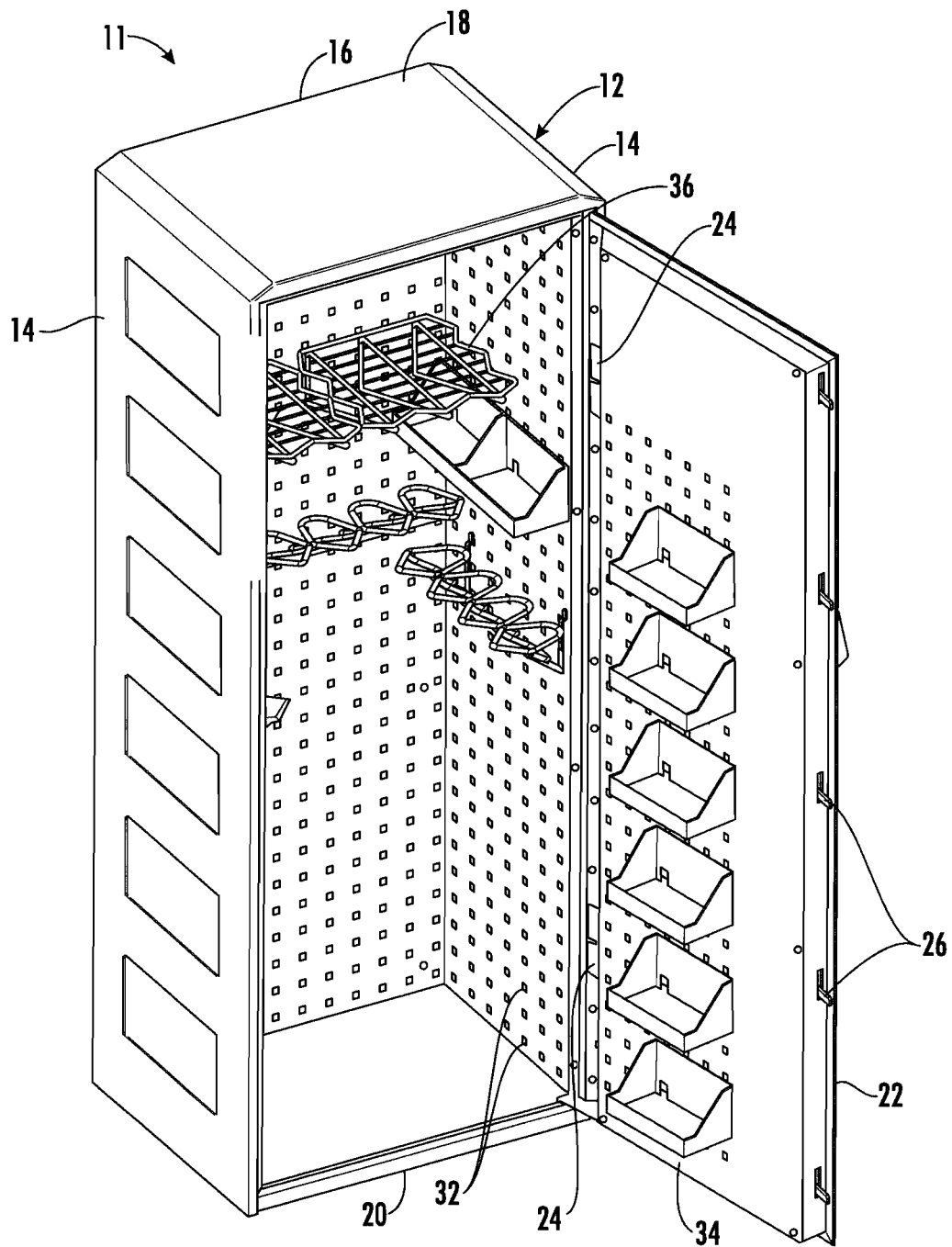
FIG. 1 is a perspective view of a firearm storage safe with an open door to show interior details.
Figure 2:
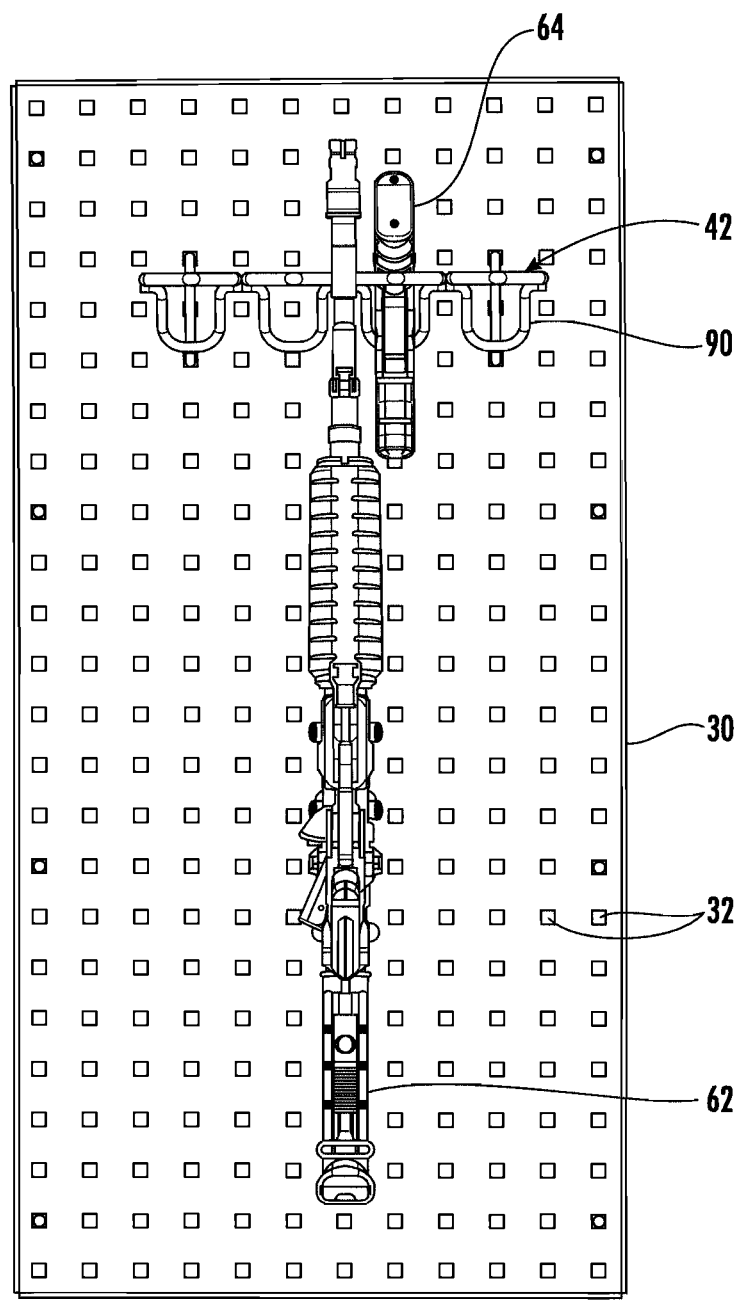
FIG. 2 is a front view of a mounting panel with a firearm retention device mounted on the panel in position for retaining both a long and a short firearm.

The reference numeral 11 designates generally a firearm storage system. The system 11 includes an enclosure device which is shown as a firearm safe 12. While a safe is shown, it is to be understood that the enclosure can be a firearm cabinet, gun cabinet (often called a gun case), a room with a door or the like which has at least one wall or other support element that is generally vertically disposed. For the sake of convenience, the enclosure will be herein referred to as a safe unless otherwise designated and in the claims. In the preferred and illustrated embodiment, the safe 12 includes at least three connected walls, including two sidewalls 14, a back wall 16, a top wall 18 and a bottom wall 20 connected together as by welding or fasteners. Preferably, the safe 12 (or a room such as a closet) also includes a hinged door 22 that is movably mounted to one of the sidewalls 14 as by at least one hinge, such as a pair of spaced apart hinges 24. At least one locking device, such as a door latch and/or sliding bolts 26, can be mounted to the door 22, which, when extended, extend into apertures (not shown) for securing the door 22 in a closed position. A lock mechanism, such as a combination lock, is preferably operably associated with the bolts to releasably retain the bolts 26 in their locking position. It is also to be understood that the safe 12 can be provided with fireproofing material. Such fireproofing material reduces heat transfer through the walls 14, 16, 18 and 20 and door 22 to help protect the contents of the safe 12 in the event of a fire on the exterior of the safe 12. Such safes are well known in the art. An example of such a safe is disclosed in U.S. patent application Ser. No. 15/784,665, the disclosure of which is incorporated herein by reference.

In the illustrated embodiment, the safe 12 is provided with at least one interior panel 30, and preferably a plurality of such panels, attached to at least one of the sidewalls 14, back wall 16 and/or door 22 to be positioned in the interior of the safe 12. Preferably, the panels 30 are perforated with a plurality of through holes 32 configured for mounting of one or more storage devices for holding one or more objects in a retained condition, as more fully described below. The holes 32 can be round, rectangular, including square, or any other suitable shape. Storage devices can also include at least one tray and preferably a plurality of trays 34, at least one shelf 36, and preferably a plurality of shelves 36 in preselected positions. In a preferred embodiment, the panels 30 are of the style typically referred to as pegboards. A pegboard system utilizes a space behind the pegboard to allow mounting of pegboard accessory devices to utilize a hook mounting system with the hooks extending through the openings to engage the back wall of the pegboard. While a pegboard system is illustrated, it is to be understood that the panels 30 could also be of a slatwall type system. Both systems provide both horizontal and vertical selection of positioning of the above-mentioned and below described storage devices.

Orientation and position terms as used herein are in the sense of rear or rearward being at or toward a mounting wall or the panel 30, forward or front being at or toward the opening into the notch forming structure 70, and laterally being along the length between opposite ends of a storage device 42.

Figure 3:
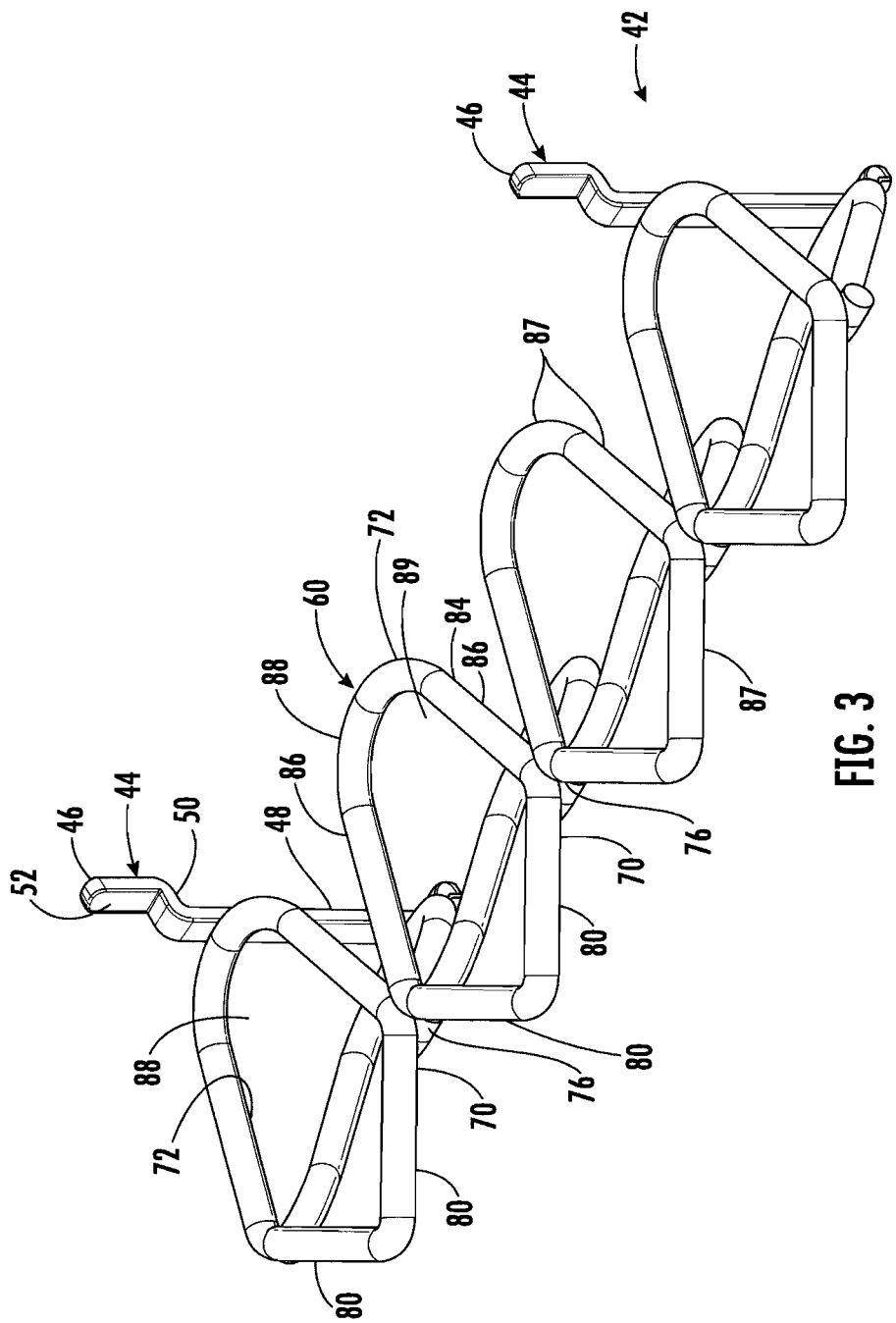
FIG. 3 is an enlarged isometric view of the firearm retention device shown in FIG. 2.
Figure 4:
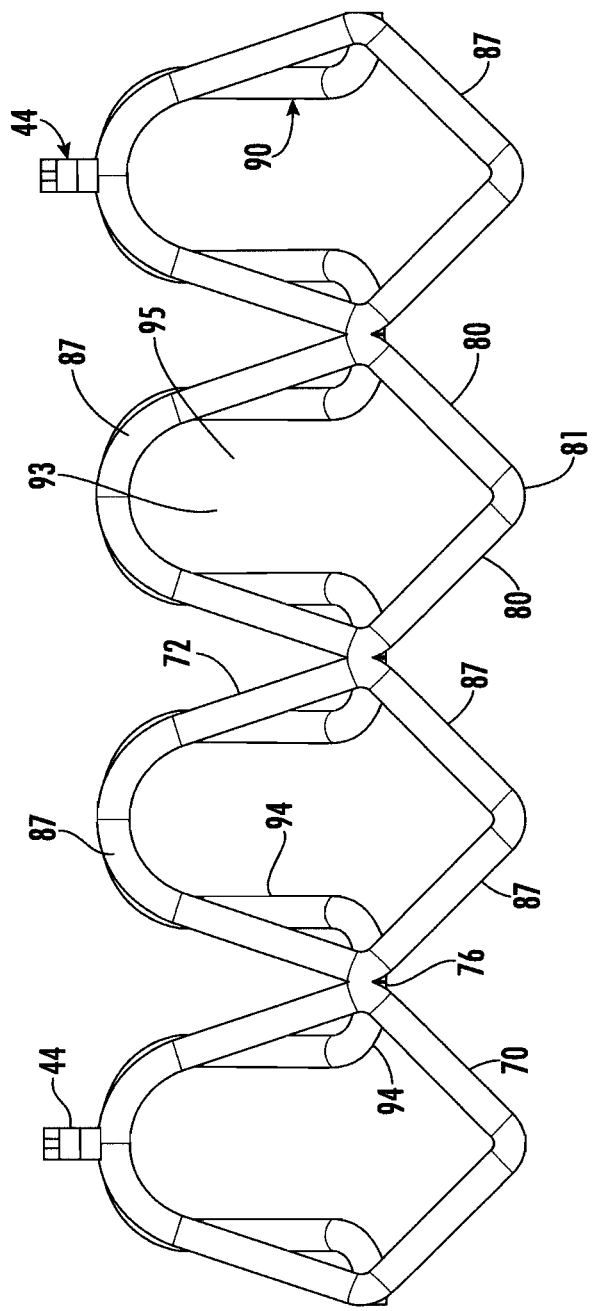
FIG. 4 is an enlarged top plan view of the firearm retention device shown in FIG. 3.
Figure 5:
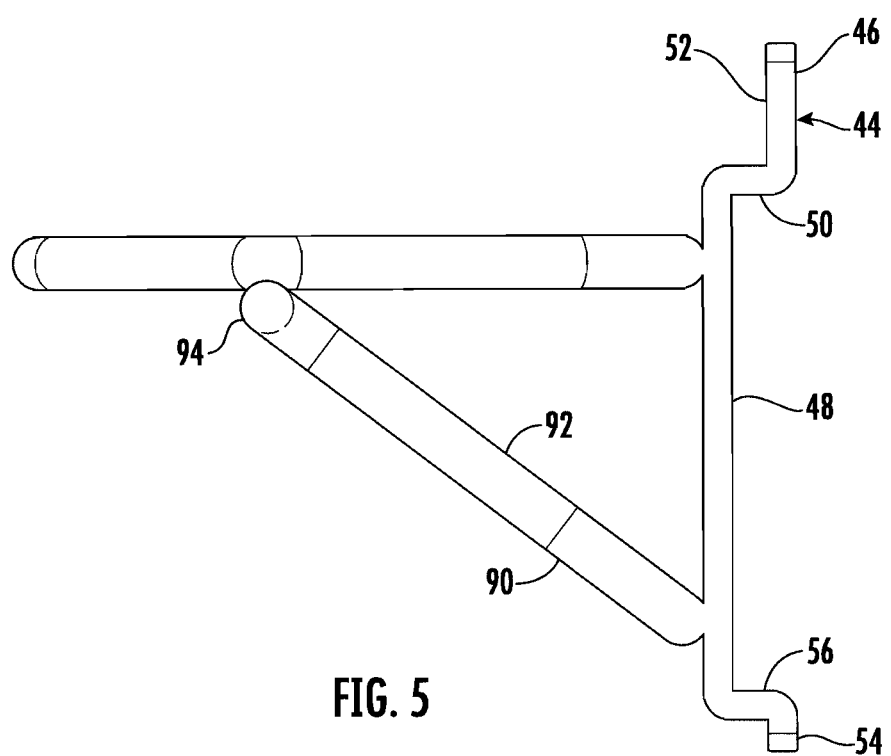
FIG. 5 is an enlarged end view of the firearm retention device shown in FIGS. 3 and 4.

FIGS. 3-5 illustrate a firearm storage device, designated generally 42, adapted for removable securement to a panel 30 and configured for releasably retaining a plurality of firearms in the firearm storage system 11. The storage device 42 will be described in the first embodiment as being adapted for use with a pegboard panel 30. Is it to be understood, however, that minor modifications can be made to the device 42 to utilize it with other mounting systems, such as a slatwall system. The storage device 42 is provided with at least one, and preferably a plurality of mounting devices 44, adapted for removably mounting a storage device 42 to a panel 30. The mounting devices 44 limit vertical and horizontal movement of a storage device 42 when mounted to a panel 30 and in use. As shown, the mounting device 44 includes an upper positioned tab 46 that is received within a respective through hole 32. The mounting device 44 includes a beam portion 48 from which the tab 46 extends, and is connected together by a leg portion 50. The leg portion 50 and respective tab 46 form a hook with a forward facing surface 52 that will engage a back or inside surface of a respective panel 30 to retain the device 42 removably mounted to a panel 30. The mounting device 44 also includes a second tab 54 extending from the beam 48 at its lower end, and is connected thereto by a second leg 56. The tab 54 and leg 56 form a second hook. The tab 54 also extends through a respective through hole 32, and is positioned to also engage the back surface of the panel 30. In a preferred embodiment, the tab 46 has a length longer than the length of the tab 54 to assist in mounting the mounting device 44 to a panel 30. The use of a pair of hook forming tabs 46, 54 locks the storage device 42 against both unintended downward movement and outward movement, while permitting removable mounting. It is to be noted that other forms of mounting means for the storage device 42 can be provided. For example, the hooks that are shown as being formed by the tabs 46, 54 could also be downwardly opening hooks that would also allow the same removable secure mounting. Additionally, while the mounting system for the storage device 42 is usable with a pegboard style panel 30, a hook arrangement could also be used for mounting of the storage device 42 on a slatwall system. Such hook arrangements are well known in the art, but typically do not use upper and lower hooks; however an upper hook arrangement typically does not resist unintended upward movement. If a pegboard style panel 30 or a slatwall style panel 30 is not used, the storage device 42 can be provided with other suitable means for its mounting to a wall. For example, the storage device 42 can be provided with tabs with through apertures for the use of screw fasteners to fasten a storage device 42 to a vertical wall. Such tabs could also be used for mounting the storage device 42 to a generally horizontal surface of a structural member, such as an enclosure wall.

Figure 6:
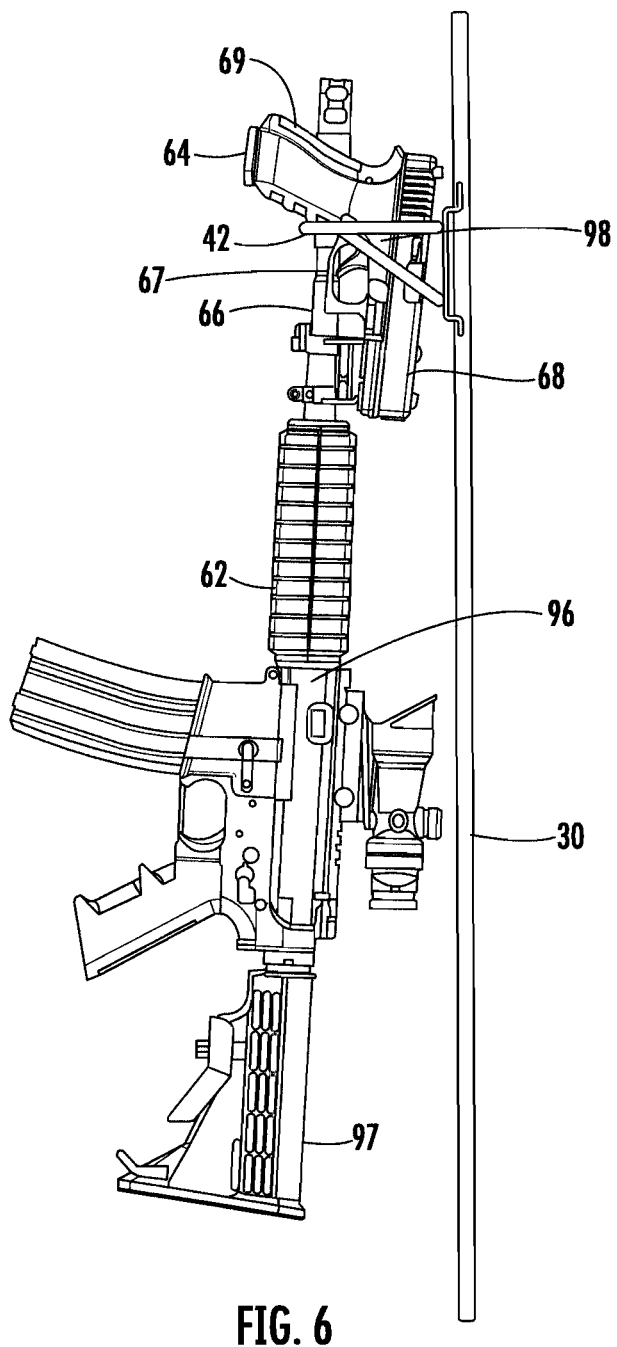
FIG. 6 is a side elevation view of the firearm retention device, mounting panel and retained firearms.

As best seen in FIGS. 3-6, the storage device 42 includes at least one and preferably a plurality of structural elements for forming at least one and preferably a plurality of elements for simultaneously releasably retaining at least one long firearm 62 (like a rifle or shotgun) and at least one short firearm 64 (like a pistol) in side-by-side relationship. In the illustrated structure, the storage device 42 is provided with retaining elements for the simultaneous storage of four short firearms 64 and four long firearms 62, although any suitable number of such elements can be provided. As best seen in FIG. 3, a storage device 42 includes a firearm nest member 60 operably associated with the mounting devices 44 and operable for simultaneously releasably retaining at least two firearms, with one being a long firearm 62 and one being a short firearm 64 in a side-by-side relationship, and preferably having their barrels 66, 68 respectively, generally vertically disposed. Such a storage orientation is best seen in FIG. 6.

The nest member 60 includes at least one notch forming structure 70 and at least one loop 72, and preferably a plurality of each extending along the length of the storage device 42 in side-by-side relationship, forming a longitudinally extending storage array. The notch structures 70 and loop structures 72 form an alternating array of notch structures and loop structures with one being adjacent to or between the others in side-by-side array relationship as best seen in FIG. 3. The notch structures 70 are configured for releasably retaining a long firearm 62, and the loop structures 72 are configured for releasably retaining a short firearm 64 adjacent one another. The configuration of a notch structure 70 allows for retention release of a long gun 62 by forward movement, and the configuration of a loop structure 72 allows for release of a short gun 64 by upward vertical movement. This configuration permits the storage of a short firearm 64 adjacent to a long firearm 62 or between two long firearms 62, utilizing heretofore unutilized storage space and improving storage efficiency. In the illustrated structure, the notch structures 70 are generally V-shaped having a central apex 76, which is shown as also being generally V-shaped. It is to be recognized that the apex 76 can be any suitable shape. The apex 76 is formed between two outwardly and forwardly diverging legs 80 at their proximal ends, forming the generally V-shaped notch structure 70 and open outwardly. Additionally, legs 80 of adjacent notch structures 70 can be connected at 81, their distal ends. The loop structures 72 are formed by a pair of legs 80 and a generally U-shaped member 84, which is shown as comprising a second pair of legs 86 connected by a bight portion 88. A loop structure 72 is configured to at least substantially surround a barrel 68 and/or trigger guard 67 of a short firearm 64 to prevent it from falling forward. The loop structure 72 and a respective pair of legs 80 form a receiver 89 for receipt of a pistol barrel therein with a trigger guard 67 or handle grip 69 resting on adjacent legs 80. A loop structure 72 and notch structure 70 can be formed of bent wire or rod, preferably, metal wire or rod. If desired, the loop structures 72 and notch structures 70 can be coated 87 with a polymeric material to reduce the risk of marring of a firearm retained either in the opening formed by the loop structure 72 or in the notch structure 70. A suitable polymeric material would be PVC. Adjacent loop structures 72 can be secured together as by welding, and can be connected to the mounting devices 44 as by welding also. Vertical support of the free ends of the loop structures 72 can be provided by a brace member 90 that has a portion secured to a respective mounting device 44 as by welding and another portion secured to the loop structures 72 also as by welding. In the illustrated structure, the brace 90 can be of a formed wire or rod member that can also be coated, as are the loop structures 72. The brace members 90 are configured to preferably be at an acute angle relative to the panel 30 when the storage device 42 is mounted thereon. In the illustrated structure, the brace member 90 is a series of U-shaped portions 94. The U-shaped portion 94, as shown, is secured to the loop structures 72 as by welding adjacent to the apexes 76. The nest member 60 thus forms a series of alternating notch structures 70 and loop structures 72 to allow the storage of firearms, also in an alternating array of long and short firearm storage pattern. As shown, the loop structures 72 have at least a portion positioned rearwardly of the notch structures 70 and a centerline through each notch structure is positioned laterally of one or more centerlines through adjacent loop structures 72. As shown in FIG. 4, the openings 93 through the loop structures 72 are generally vertically aligned with a respective opening 95 through a brace member 90.

Figure 7:
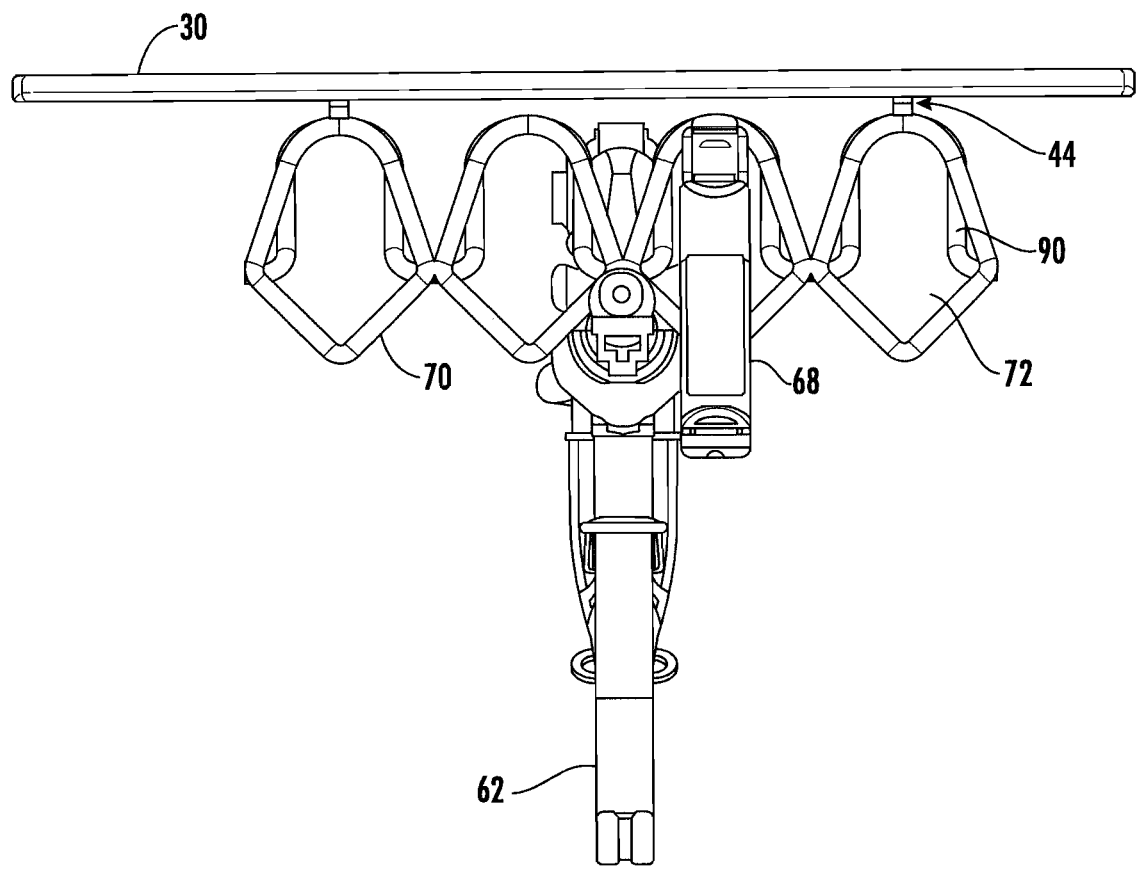
FIG. 7 is top plan view of the firearm retention device, mounting panel and retained firearms of FIG. 6.

As best seen in FIGS. 6, 7, the firearms 62 (long firearm), 64 (short firearm) are stored wherein the barrels 66 and 68 (or structure surrounding the barrel, such as a slide or handguard) are generally vertically disposed with the short firearm 64 being received in a respective loop formed by a loop structure 72 and the long firearm 62 being received within a respective notch formed by the notch structure 70. The centers of the notches 70 are preferably spaced on the order of 2 to 4 inches apart, while the centers of the loops 72 are similarly spaced. This spacing provides enough room for long firearm storage, and particularly bolt action rifles, and utilizes currently unused space between adjacent long firearms for a pistol. As best seen in FIG. 6, the center of gravity 96 of the long firearm 62 is positioned further out from the panel 30 than where the barrel 66 rests in its notch structure 70, and is laterally positioned between where the butt stock 97 rests on an underlying surface and where the barrel 66 rests in an apex 76. This applies a force on the firearm 62 directed toward the panel 30 to resist its falling forward and out of its respective notch structure 70. Likewise, the firearm 64 has a portion, such as a trigger guard 67 or hand grip 69, engaged with respective adjacent legs 80 and has a center of gravity 98, likewise positioned such that the grip portion 69 of the pistol has a force vector directed toward the panel 30 such that the firearm 64 has its barrel 68 forced toward the panel 30.

Figure 8:
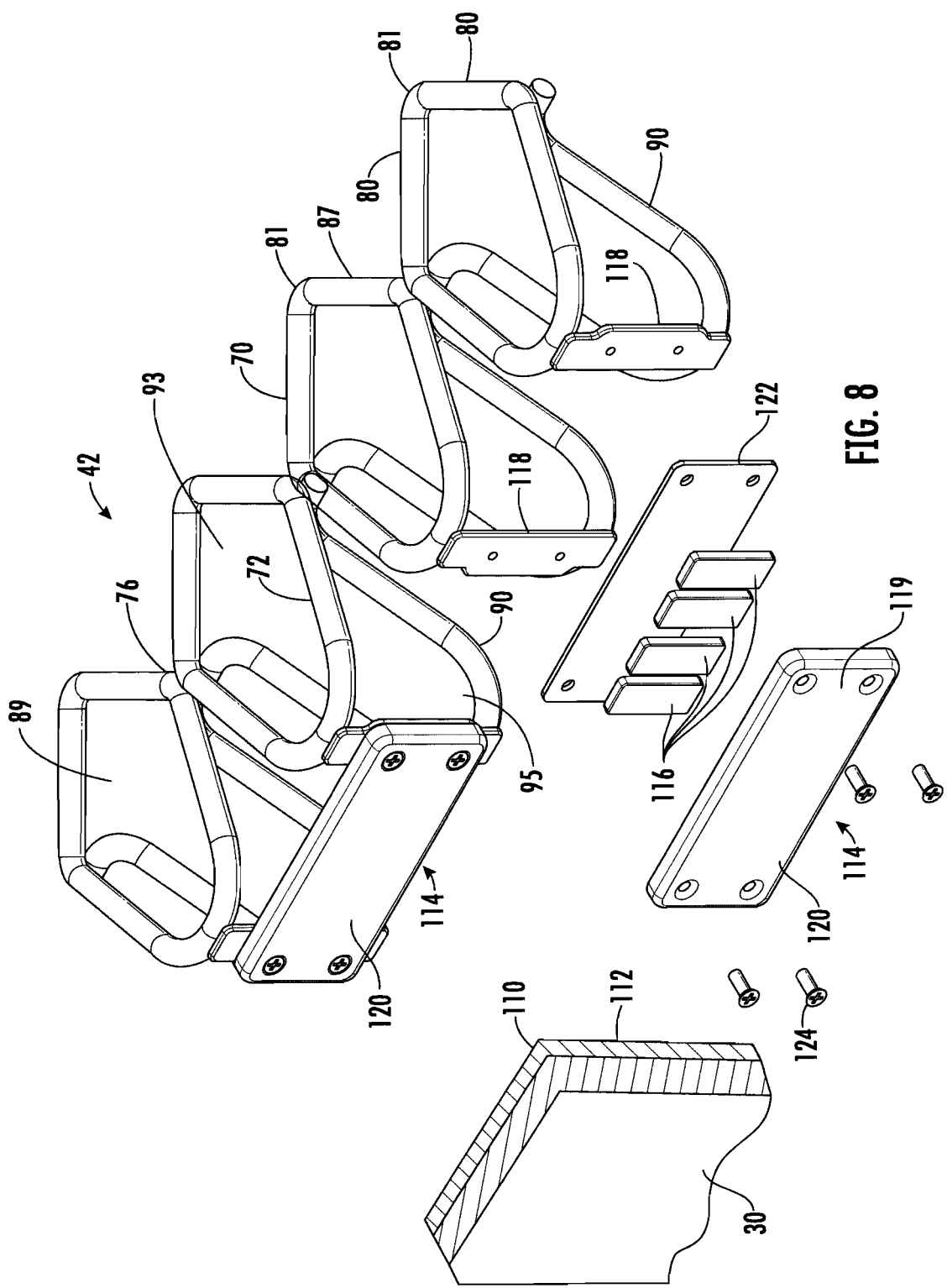
FIG. 8 is a perspective view of a modified form of firearm storage device for mounting on a panel.

FIG. 8 illustrates an alternate embodiment of mounting means for a firearm storage device 42. As described above, the storage device 42 is adapted for removable securement to a panel 30 and is configured for releasably retaining a plurality of firearms in the firearm storage system 11 in side-by-side relationship. The panel 30 can be a pegboard panel or a slatwall panel, or a portion of a structural enclosure wall. The panel 30 as shown will include a magnetic component 110 that can be in the form of a magnetic pegboard or slat wall, or can be a magnetic overlay attached thereto or to a wall as with an adhesive. The panel can be a completely magnetic panel if desired. The magnetic component 110 can be any suitable size or shape. The pegboard or slat wall can be made of a magnetic material, such as an iron alloy that can be coated as with paint. The panel 30 has a generally planar section 112 or a plurality of such sections as are found in slat walls. The storage device 42 is provided with at least one and preferably a plurality of mounting devices 114 adapted for removably mounting a storage device 42 to a panel 30 through the use of magnetism. The mounting devices 114 also limit vertical and horizontal movement of a storage device 42 due to friction between the mounting devices 114 and the magnetic component 110, but can be selectively moved to any suitable horizontal/vertical position on the panel 30.

As shown, the storage device 42 in the modified form has at least one magnetic mounting device 114 that includes at least one or a plurality of magnets 116 secured to portions of the storage device 42 and positioned for removably mounting the storage device 42 to a panel 30 or other suitable support structure. In the illustrated structure, the storage device 42 includes one or more mounting brackets 118 suitably secured to portions of the storage device 42. As shown, the brackets 118 are secured to a rearward portion of the storage device 42 as by being secured to a bight portion 88 and a brace member 90. The brackets 118 as shown are generally vertically oriented, and are spaced apart laterally along the length of the storage device 42. While a plurality of mounting devices 114 are shown, is to be understood that a single mounting device 114 can be utilized. In a preferred embodiment, a plurality of mounting devices 114 are utilized and are in a laterally spaced apart relationship, each being secured to respective brackets 118. The mounting of the mounting devices 114 can be with screw fasteners 124 or the like. As shown, the mounting devices 114 include a housing 119 having a cover 120 and a base plate 122, which, when assembled, form a magnet enclosure. The attachment of the cover 120 to the base plate 122 can be with screw fasteners 124 or any other suitable securing means. The base plate 122 is preferred as the portion to be secured to the brackets 118 as described above. In the illustrated structure, the magnets 116 are contained within the mounting device 114, and are operable to magnetically mount each of the mounting devices 114, and hence a storage device 42, to a panel 30. The height of a magnet 116 is preferably long enough to have a magnet bridge grooves in a slat wall system. The panel 30 would then be made of a magnetic material or include magnetic material that is sufficient for magnetic mounting of the storage device 42. The use of a magnetic mounting system allows a storage device 42 to be mounted to a pegboard panel 30, a slatwall or other forms of panels, as long as the panels are magnetic or have a magnetic section. The need for mechanical mounting is thus obviated, and the panel 30 need not be a pegboard or a slatwall type, but can be used therewith so long as the panel 30 is magnetic. It is to be understood that the cover 120 and baseplate 122 can be made of a magnetic material or a nonmagnetic material, as long as its thickness does not interfere with magnetic mounting to a panel 30.

At least one magnet 116 is included in a mounting device 114. The magnet 116 can be of a conventional type or of a Halbach array type, or a combination thereof. Halbach array type magnets are well known in the art.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A firearm storage device adapted for selective removable mounting in a selected vertical and horizontal position, the device including:
   at least one mounting device adapted to be removably mounted to a generally vertically oriented panel;
   a plurality of notch structures forming outwardly opening notches positioned laterally adjacent one another, said notch structures being operably associated with the at least one mounting device for removably mounting the notch structures to a panel; and
   at least one loop structure positioned laterally between a respective pair of said notch structures and operably associated with the at least one said mounting device for removably mounting the loop structure to a panel, so that the notch structures and the loop structures form an alternating array of notch structures and loop structures with one being adjacent to or between the others in side-by-side array relationship,
   wherein the notch structures are configured for releasably retaining a long firearm, and the loop structures are configured for releasably retaining a short firearm adjacent one another, the configuration of the notch structure allowing for retention release of a long gun by forward movement, and the configuration of the loop structure allows for release of a short gun by upward vertical movement.

2. The firearm storage device of claim 1 wherein the mounting device including at least one magnet for securing the at least one mounting device to the firearm storage device.

3. The firearm storage device of claim 2 wherein the mounting device including at least one Halbach magnet.

4. The firearm storage device of claim 3 including a generally vertically disposed panel made at least partially of a magnetic material.

5. The firearm storage device of claim 1 wherein the at least one mounting device including a plurality of said mounting devices positioned in laterally spaced apart relationship, said loop structures and said notch structures being secured together to form an assembly.

6. The firearm storage device of claim 5 wherein said at least one loop structure including a plurality of said loop structures positioned in laterally spaced apart relationship.

7. The firearm storage device of claim 1 wherein the mounting devices each including a first hook adapted to be received in a respective aperture in a peg board panel for mounting of the storage device to a peg board panel.

8. The firearm storage device of claim 7 wherein the mounting devices each including a said first hook and a second hook in spaced relationship, each adapted to be received in a respective aperture in a peg board panel in vertically spaced relationship.

9. The firearm storage device of claim 7 wherein the first hooks are adapted to be received in a slatwall panel for mounting of the storage device to a slatwall panel.

10. The firearm storage device of claim 1 including an enclosure, the enclosure including a panel adapted for mounting the storage device thereto.

11. The firearm storage device of claim 10 wherein the enclosure including a safe with a locking door.

12. The firearm storage device of claim 11 wherein the panel is a pegboard panel.

13. The firearm storage device of claim 11 wherein the panel is a slatwall panel.

14. The firearm storage device of claim 11 wherein the panel having a magnetic portion.

15. The firearm storage device of claim 1 wherein the notch structures are V-shaped having a central apex, the apex is formed between two outwardly and forwardly diverging legs at their proximal ends, forming the generally V-shaped notch structure, the loop structures are formed by a pair of legs and a U-shaped member.

16. The firearm storage device of claim 15 wherein the loop structure is sized to surround the barrel portion of a short firearm.

17. The firearm storage device of claim 15 wherein the loop structure is sized to surround the barrel portion and the trigger guard of a short firearm.

18. The firearm storage device of claim 17 wherein the grip portion of the short firearm rests upon the adjacent legs when positioned within the loop structure.

* * * * *